United States Patent
Andrieiev et al.

(10) Patent No.: US 12,046,094 B2
(45) Date of Patent: Jul. 23, 2024

(54) ENTRANCE MANAGEMENT SYSTEM AND OPERATION METHOD THEREOF

(71) Applicant: Samsung Electronics Co., Ltd., Suwon-si (KR)

(72) Inventors: Oleksandr Andrieiev, Suwon-si (KR); Jieun Keum, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 268 days.

(21) Appl. No.: 17/440,923

(22) PCT Filed: Mar. 17, 2020

(86) PCT No.: PCT/KR2020/003633
§ 371 (c)(1),
(2) Date: Sep. 20, 2021

(87) PCT Pub. No.: WO2020/197146
PCT Pub. Date: Oct. 1, 2020

(65) Prior Publication Data
US 2022/0165112 A1    May 26, 2022

(30) Foreign Application Priority Data
Mar. 25, 2019    (KR) .......................... 10-2019-0033942

(51) Int. Cl.
*G07C 9/28*    (2020.01)
*H04W 4/80*    (2018.01)

(52) U.S. Cl.
CPC ................. *G07C 9/28* (2020.01); *H04W 4/80* (2018.02)

(58) Field of Classification Search
CPC ........ G07C 9/28; G07C 9/20; G07C 2209/63; G07C 9/00182; G07C 2009/00769; H04W 4/80
See application file for complete search history.

(56) References Cited

U.S. PATENT DOCUMENTS

| | | | |
|---|---|---|---|
| 9,049,679 | B2 | 6/2015 | Park et al. |
| 9,905,101 | B1 | 2/2018 | Billau et al. |
| 10,129,507 | B2 | 11/2018 | Landers, Jr. et al. |

(Continued)

FOREIGN PATENT DOCUMENTS

| | | | |
|---|---|---|---|
| CN | 107341887 A | * | 11/2017 |
| JP | 2002-334361 A | | 11/2002 |

(Continued)

OTHER PUBLICATIONS

International Search Report dated Jun. 25, 2020, issued in International Application No. PCT/KR2020/003633.

(Continued)

*Primary Examiner* — Ryan W Sherwin
(74) *Attorney, Agent, or Firm* — Jefferson IP Law, LLP

(57) ABSTRACT

Provided are an entrance management system and an operating method thereof. The operating method of an entrance management system may include: detecting an electronic device by using short-range wireless communication; measuring a distance from the electronic device; when the electronic device enters a set first range, opening an entrance; and when the distance from the electronic device decreases to a preset value or less, closing the entrance.

14 Claims, 13 Drawing Sheets

(56) References Cited

U.S. PATENT DOCUMENTS

| | | | |
|---|---|---|---|
| 10,192,378 B2 | 1/2019 | Shin et al. | |
| 2007/0268145 A1 | 11/2007 | Bazakos et al. | |
| 2016/0018560 A1* | 1/2016 | Shimizu | G01P 15/00 |
| | | | 73/488 |
| 2016/0042580 A1* | 2/2016 | Funayama | G07C 9/20 |
| | | | 701/2 |
| 2016/0379428 A1* | 12/2016 | Ahearn | H04W 12/64 |
| | | | 340/5.61 |
| 2017/0148243 A1* | 5/2017 | Shin | G07C 9/00309 |
| 2017/0156061 A1* | 6/2017 | Hamada | H04W 76/14 |
| 2018/0070202 A1* | 3/2018 | Mujibiya | G06F 1/1698 |
| 2018/0225898 A1* | 8/2018 | Kirkland | G07C 9/28 |
| 2018/0310272 A1 | 10/2018 | Younis | |
| 2019/0024438 A1* | 1/2019 | Budd | G07C 9/28 |
| 2020/0388093 A1 | 12/2020 | Shin et al. | |
| 2021/0082214 A1* | 3/2021 | Kim | H04B 17/318 |

FOREIGN PATENT DOCUMENTS

| | | | |
|---|---|---|---|
| JP | 2005272088 A | * | 10/2005 |
| JP | 2006-127344 A | | 5/2006 |
| JP | 2008-134730 A | | 6/2008 |
| JP | 5155553 B2 | | 3/2013 |
| JP | 2016-062262 A | | 4/2016 |
| KR | 10-587529 B1 | | 6/2006 |
| KR | 10-2014-0002206 A | | 1/2014 |
| KR | 17-14899 B1 | | 3/2017 |
| KR | 10-2017-0060553 A | | 6/2017 |
| KR | 10-2017-0060554 A | | 6/2017 |

OTHER PUBLICATIONS

Alison Griswold, "These Heat Maps Show How Retailers Track You as You Shop", https://www.businessinsider.com/how-retailers-track-shoppers-in-heat-maps-2014-1.

Korean Office Action dated Jan. 17, 2024, issued in Koren Patent Application No. 10-2019-0033942.

\* cited by examiner

FIG. 1
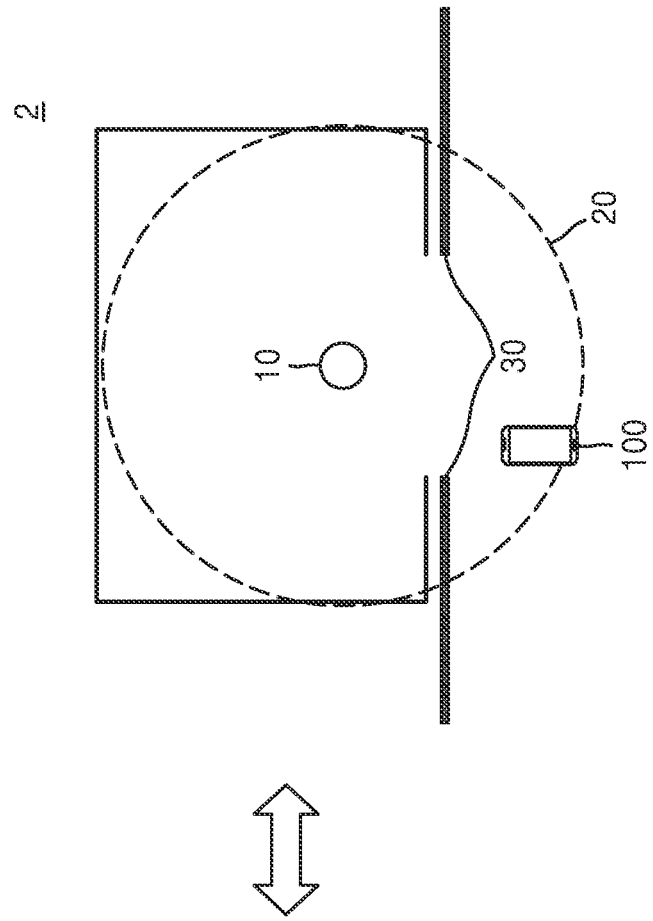
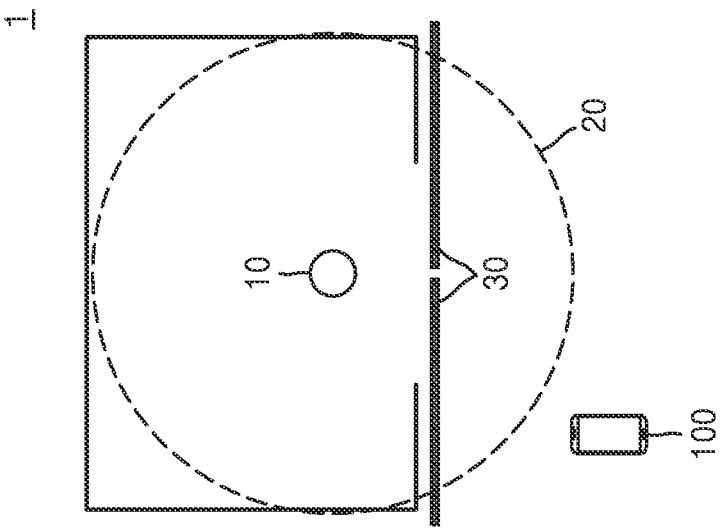

ENTRANCE MANAGEMENT SYSTEM AND OPERATION METHOD THEREOF

TECHNICAL FIELD

The disclosure relates to an entrance management system and an operating method thereof.

BACKGROUND ART

An entrance management system is a system that is provided in facilities requiring security to manage visitors who intend to enter a particular space through an entrance. Recently, entrance management systems have become widely used from facilities requiring high security levels, such as airports, ports, and research institutes, to general facilities, such as offices, residential facilities, and subways. Also, the entrance management system may be utilized to separate a particular space and form a limited area. For example, the entrance management system may form a particular space within an entrance that is controlled by the entrance management system. The particular space may be variously utilized. For example, data about a user, such as the amount of time users stay at a particular position in a set area, may be obtained and used to analyze the users' behaviors.

Moreover, with recent development of communication technology, various types of short-range wireless communication technology have emerged. Among them, short-range wireless communication is a technology for performing communication at a short distance, and may include near field communication (NFC), wireless local area network (WLAN) (Wi-Fi), Zigbee, infrared data association (IrDA) communication, Wi-Fi direct (WFD) communication, Ant+ communication, ultrasound communication, ultra-wide band (UWB) communication, etc. The short-range wireless communication may be utilized by convergence, combination and/or application with technologies in various fields, for example, the entrance management system.

DESCRIPTION OF EMBODIMENTS

Technical Problem

The disclosure relates to an entrance management system using short-range wireless communication, and an operating method thereof.

Solution to Problem

An operating method of an entrance management system, according to an embodiment of the disclosure, may include: detecting an electronic device by using short-range wireless communication; measuring a distance from the electronic device; when the electronic device enters a set first range, opening an entrance; and when the distance from the electronic device decreases to a preset value or less, closing the entrance.

An entrance management system, according to an embodiment of the disclosure, may include: an entrance; a short-range wireless communicator; at least one memory storing a program for an operation of the entrance management system; and at least one processor configured to execute the program to control detecting an electronic device by using the short-range wireless communicator, measuring a distance from the electronic device, opening the entrance when the electronic device enters a set first range, and closing the entrance when the distance from the electronic device decreases to a preset value or less.

In a computer program product including at least one computer-readable recording medium having stored therein a program to execute an operating method of an entrance management system, according to an embodiment of the disclosure, the operating method of the entrance management system may include: detecting an electronic device by using short-range wireless communication; measuring a distance from the electronic device; when the electronic device enters a set first range, opening an entrance; and when the distance from the electronic device decreases to a preset value or less, closing the entrance.

Advantageous Effects of Disclosure

According to an embodiment of the disclosure, an entrance management system using short-range wireless communication, and an operating method thereof may be provided.

BRIEF DESCRIPTION OF DRAWINGS

FIG. 1 is a diagram for describing an entrance management system according to an embodiment of the disclosure.

BEST MODE

Figure 2:
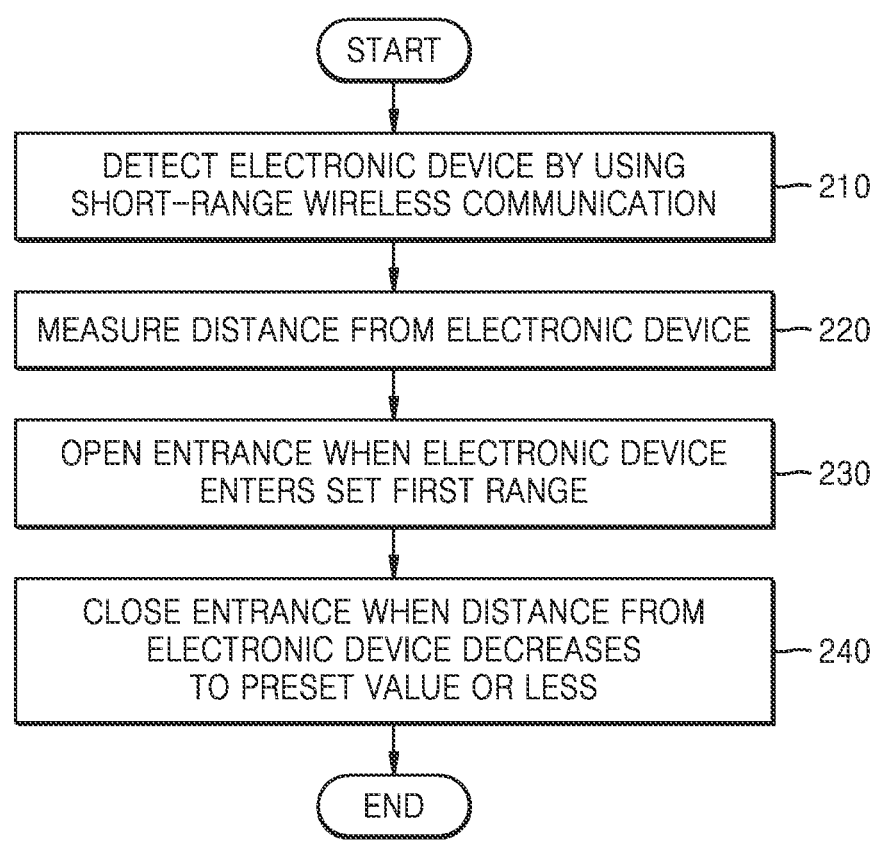
FIG. 2 is a flowchart for describing an operating method of an entrance management system, according to an embodiment of the disclosure.

An operating method of an entrance management system, according to an embodiment of the disclosure, includes:

detecting an electronic device by using short-range wireless communication; measuring a distance from the electronic device; when the electronic device enters a set first range, opening an entrance; and when the distance from the electronic device decreases to a preset value or less, closing the entrance.

In an embodiment, the operating method may further include, when the distance from the electronic device increases, immediately closing the entrance.

In an embodiment, the operating method may further include, when a user is detected inside the entrance after the entrance is immediately closed, performing a procedure for dealing with the user.

In an embodiment, the operating method may further include performing an authentication procedure on the electronic device or a user of the electronic device.

In an embodiment, the operating method may further include: when the electronic device enters a set second range, obtaining at least one of a number of users positioned within the second range or a number of authenticated users; and when the number of users positioned within the second range or the number of authenticated users is equal to a number of authenticated users allowed within the second range, opening the entrance.

In an embodiment, the operating method may further include when the number of users positioned within the second range or the number of authenticated users is not equal to the number of authenticated users allowed within the second range, not opening the entrance.

In an embodiment, the entrance may include a first entrance that is an external entrance and a second entrance that is an internal entrance, and the second range may be formed by physical barriers between the first entrance and the second entrance.

In an embodiment, the operating method may further include: tracking the electronic device through trilateration using at least three fixed sensors, and the tracking of the electronic device may include: obtaining first measurement information by measuring a position of the electronic device at a first time point, the first measurement information including time information about the first time point and first position information about the electronic device; obtaining second measurement information by measuring a position of the electronic device at a second time point, the second measurement information including time information about the second time point and second position information about the electronic device; and tracking the electronic device based on the first measurement information and the second measurement information.

In an embodiment, the operating method may further include tracking the electronic device through trilateration using at least one moving sensor, and the tracking of the electronic device may include: obtaining first measurement information by measuring a relative position of the electronic device with respect to the at least one moving sensor at a first time point, the first measurement information including time information about the first time point and first relative position information about the electronic device; obtaining second measurement information by measuring a relative position of the electronic device with respect to the at least one moving sensor at a second time point, the second measurement information including time information about the second time point and first relative position information about the electronic device; obtaining third measurement information by measuring a relative position of the electronic device with respect to the at least one moving sensor at a third time point, the third measurement information including time information about the third time point and first relative position information about the electronic device; and tracking the electronic device based on the first measurement information, the second measurement information, and the third measurement information.

In an embodiment, the tracking of the electronic device based on the first measurement information, the second measurement information, and the third measurement information may include: obtaining second sensor position information about the moving sensor at the second time point based on first sensor position information about the moving sensor at the first time point and movement information about the moving sensor; obtaining third sensor position information about the moving sensor at the third time point based on the first sensor position information, the second sensor position information, or the movement information about the moving sensor; and tracking the electronic device based on the first sensor position information, the second sensor position information, and the third sensor position information.

In an embodiment, the obtaining of the second measurement information may further include estimating a positional movement of the electronic device or a movement speed of the electronic device and reflecting a compensation value according to the positional movement or the movement speed in the second relative position information, and the obtaining of the third measurement information may further include estimating a positional movement of the electronic device or a movement speed of the electronic device and reflecting a compensation value according to the positional movement or the movement speed in the third relative position information.

In an embodiment, the short-range wireless communication may include an ultra-wide band (UWB).

An entrance management system, according to an embodiment of the disclosure, includes: an entrance; a short-range wireless communicator; at least one memory storing a program for an operation of the entrance management system; and at least one processor configured to execute the program to control detecting an electronic device by using the short-range wireless communicator, measuring a distance from the electronic device, opening the entrance when the electronic device enters a set first range, and closing the entrance when the distance from the electronic device decreases to a preset value or less.

In an embodiment, the at least one processor may be configured to control, when the distance from the electronic device increases, immediately closing the entrance.

In an embodiment, the entrance management system may further include a sensor unit, and the at least one processor may be configured to control, when a user is detected inside the entrance by using the sensor unit after the entrance is immediately closed, performing a procedure for dealing with the user.

In an embodiment, the at least one processor may be configured to control performing an authentication procedure on the electronic device or a user of the electronic device.

In an embodiment, the at least one processor may be configured to control obtaining the number of users positioned within the second range or the number of authenticated users when the electronic device enters the second range, and opening the entrance when the number of users positioned within the second range or the number of authenticated users is equal to the number of authenticated users allowed within the second range.

In an embodiment, the at least one processor may be configured to control not opening the entrance when the number of users positioned within the second range or the number of authenticated users is not equal to the number of authenticated users allowed within the second range.

In an embodiment, the entrance may include a first entrance that is an external entrance and a second entrance that is an internal entrance, and the second range may be formed by physical barriers between the first entrance and the second entrance.

In an embodiment, the short-range wireless communicator may include at least three fixed sensors, and the at least one processor may be configured to control: tracking the electronic device through trilateration using the at least three fixed sensor; obtaining first measurement information by measuring a position of the electronic device at the first time point, the first measurement information including time information about a first time point and first position information about the electronic device; obtaining second measurement information by measuring a position of the electronic device at the second time point, the second measurement information including time information about a second time point and second position information about the electronic device; and tracking the electronic device based on the first measurement information and the second measurement information.

In an embodiment, the short-range wireless communicator may include at least one moving sensor, and the at least one processor may be configured to control: tracking the electronic device through trilateration using the at least one moving sensor; obtaining first measurement information by measuring a relative position of the electronic device with respect to the at least one moving sensor at the first time point, the first measurement information including time information about a first time point and first relative position information about the electronic device; obtaining second measurement information by measuring a relative position of the electronic device with respect to the at least one moving sensor at the second time point, the second measurement information including time information about a second time point and second relative position information about the electronic device; obtaining third measurement information by measuring a relative position of the electronic device with respect to the at least one moving sensor at the third time point, the third measurement information including time information about a third time point and third relative position information about the electronic device; and tracking the electronic device based on the first measurement information, the second measurement information, and the third measurement information.

In an embodiment, the at least one processor may be configured to control: obtaining second sensor position information about the moving sensor at the second time point based on first sensor position information about the moving sensor at the first time point and movement information about the moving sensor; obtaining third sensor position information about the at least one moving sensor at the third time point based on the first sensor position information, the second sensor position information, or the movement information about the moving sensor; and tracking the electronic device based on the first sensor position information, the second sensor position information, and the third sensor position information.

In an embodiment, the at least one processor may be configured to control: estimating a positional movement of the electronic device or a movement speed of the electronic device and reflecting a compensation value according to the positional movement or the movement speed in the second relative position information; and estimating a positional movement of the electronic device or a movement speed of the electronic device and reflecting a compensation value according to the positional movement or the movement speed in the third relative position information.

In an embodiment, the short-range wireless communicator may include an ultra-wide band (UWB) communicator.

In a computer program product including at least one computer-readable recording medium having stored therein a program to execute an operating method of an entrance management system, according to an embodiment of the disclosure, the operating method of the entrance management system includes: detecting an electronic device by using short-range wireless communication; measuring a distance from the electronic device; when the electronic device enters a set first range, opening an entrance; and when the distance from the electronic device decreases to a preset value or less, closing the entrance.

MODE OF DISCLOSURE

Hereinafter, embodiments of the disclosure will be described in detail with reference to the accompanying drawings for one of ordinary skill in the art to easily execute the disclosure. However, the disclosure may have different forms and should not be construed as being limited to the embodiments described herein. In addition, in the drawings, parts not related to descriptions are omitted for the clear description of the disclosure, and throughout the specification, like reference numerals are used for like components.

As used herein, when a component is referred to as being "connected" to another component, it may be "directly connected" to the other component or may be "electrically connected" to the other component with one or more intervening components therebetween. Also, when something is referred to as "including" or "comprising" a component, another component may be further included unless specified otherwise.

Furthermore, the connecting lines, or connectors illustrated in the drawings are intended to represent example functional relationships and/or physical or logical couplings between the various components. It should be noted that many alternative or additional functional relationships, physical connections or logical connections may be present in a practical device.

The phrases "in some embodiments" or "in an embodiment" appearing in various places in the disclosure may not necessarily all refer to the same embodiment.

Some embodiments of the disclosure may be described in terms of functional block components and various processing operations. All or part of such functional blocks may be realized by any number of hardware and/or software components configured to perform the specified functions. For example, the functional blocks of the disclosure may be implemented with one or more micro-processors or with circuit structures for certain functions. Also, for example, the functional blocks of the disclosure may be implemented with various programming or scripting languages. The functional blocks may be implemented with algorithms executed by one or more processors. Furthermore, the disclosure could employ conventional techniques for electronics configuration, signal processing, and/or data control. The term "module" or "component" is used broadly and is not limited to mechanical or physical embodiments of the disclosure.

Hereinafter, the disclosure is described in detail with reference to the accompanying drawings.

FIG. 1 is a diagram for describing an entrance management system according to an embodiment of the disclosure.

Referring to FIG. 1, the entrance management system includes a short-range wireless communicator 10 and an entrance 30.

The short-range wireless communicator 10 communicates with an electronic device 100. In an embodiment, the short-range wireless communicator 10 may include a sensor. The entrance management system may detect the electronic device 100 by using the short-range wireless communicator 10 and may measure a distance from the electronic device 100. In an embodiment, the short-range wireless communicator 10 may include an ultra-wide band (UWB) communicator. A UWB may refer to a short-range high-speed wireless communication technology using a wide frequency band of several GHz or more, a low spectral density, and a short pulse width (1 nsec to 4 nsec) in a baseband state. The UWB may refer to a band itself to which UWB communication is applied. However, the short-range wireless communicator 10 is not limited thereto, and may include a near field communication (NFC) unit, a wireless local area network (WLAN) (Wi-Fi) communication unit, a Zigbee communication unit, an infrared data association (IrDA) communication unit, a Wi-Fi direct (WFD) communication unit, an Ant+ communication unit, an ultrasound communication unit, etc.

The entrance 30 controls visitors who intend to enter a space. The entrance 30 may include various types of opening/closing devices and may control the visitors by opening or closing the opening/closing devices. In an embodiment, the entrance 30 may include a door, a gate, a sliding door, a hinged door, a folding door, a revolving door, etc. In the disclosure, a sliding door will be described as an example for convenience, but the disclosure is not limited thereto, and the entrance 30 may be formed in various types. For example, the entrance 30 may be a folding door or a revolving door described above.

The electronic device 100 may be a user terminal device. For example, the electronic device 100 according to an embodiment may be a home appliance such as a television (TV), a refrigerator, a washing machine, or the like, a smartphone, a personal computer (PC), a wearable device, a personal digital assistant (PDA), a media player, a micro server, a global positioning system (GPS) device, an electronic book terminal, a digital broadcast terminal, a navigation device, a kiosk, an MPEG audio layer-3 (MP3) player, a digital camera, or other mobile or non-mobile computing devices, but is not limited thereto. The electronic device 100 may include the short-range wireless communicator 10 for communicating with the entrance management system.

Referring to the left drawing (1) of FIG. 1, the entrance 30 of the entrance management system is in a closed state. In addition, the electronic device 100 is positioned outside a communication range or a preset range 20 of the short-range wireless communicator 10 of the entrance management system. In this case, the preset range 20 may be a range in which the entrance 30 is opened when the electronic device 100 is positioned therewithin. In the left drawing (1) of FIG. 1, the electronic device 100 is positioned outside the communication range or the preset range 20 of the short-range wireless communicator 10 of the entrance management system, and thus, the entrance management system maintains the entrance 30 in a closed state.

Referring to the left drawing (1) of FIG. 1, the entrance 30 of the entrance management system is in a closed state. In addition, the electronic device 100 is positioned outside the communication range or the preset range 20 of the short-range wireless communicator 10 of the entrance management system. In this case, the preset range 20 may be the range in which the entrance 30 is opened when the electronic device 100 is positioned therewithin. Also, the entrance management system may determine whether the electronic device 100 is positioned within the preset range 20 by measuring a distance from the electronic device 100 by using the short-range wireless communicator 10. In the left drawing (1) of FIG. 1, the electronic device 100 is positioned outside the communication range or the preset range 20 of the short-range wireless communicator 10 of the entrance management system, and thus, the entrance management system maintains the entrance 30 in a closed state.

As illustrated in the left drawing (1) of FIG. 1, when the electronic device 100 moves into the communication range or the preset range 20 of the short-range wireless communicator 10 of the entrance management system in a state in which the entrance 30 of the entrance management system is closed, the entrance management system may detect the movement and open the entrance 30. Referring to the right drawing (2) of FIG. 1, the electronic device 100 moves into the communication range or the preset range 20 of the short-range wireless communicator 10 of the entrance management system, and the entrance 30 of the entrance management system is opened.

As illustrated in the right drawing (2) of FIG. 1, when the electronic device 100 moves out of the communication range or the preset range 20 of the short-range wireless communicator 10 of the entrance management system in a state in which the entrance 30 of the entrance management system is opened, the entrance management system may detect the movement and close the entrance 30 again. That is, the entrance 30 may return to the state as illustrated in the left drawing (1) of FIG. 1.

Hereinafter, an operating method of the entrance management system will be described in more detail.

FIG. 2 is a flowchart for describing the operating method of the entrance management system, according to an embodiment of the disclosure.

In operation 210, the entrance management system may detect the electronic device 100 by using short-range wireless communication. In an embodiment, the short-range wireless communication may include UWB communication. A UWB may refer to the short-range high-speed wireless communication technology using a wide frequency band of several GHz or more, a low spectral density, and a short pulse width (1 nsec to 4 nsec) in a baseband state. The UWB may refer to the band itself to which UWB communication is applied. However, the short-range wireless communication is not limited thereto, and may NFC, WLAN (Wi-Fi) communication, Zigbee communication, IrDA communication, WFD communication, Ant+ communication, ultrasound communication, etc.

In an embodiment, the short-range wireless communicator of the entrance management system may detect the electronic device 100 by receiving a signal transmitted by the electronic device 100. In more detail, the entrance management system may include a sensor for short-range wireless communication, and the sensor may identify the presence of the electronic device 100 by receiving a signal transmitted by the electronic device 100. The sensor for short-range wireless communication may include, for example, a UWB sensor. Hereinafter, for convenience of description, the sensor for short-range wireless communication will be described as the UWB sensor. However, the sensor is not limited thereto, and may include various sensors according to short-range wireless communication technology.

This process may be performed through a discovery process of short-range wireless communication. The discovery process of short-range wireless communication is a process of searching for a counterpart device to perform communication, and is a process of performing a search to transmit a search signal for searching for the counterpart device and to receive a search signal transmitted by the counterpart device. After the discovery process, a link between devices may be generated to perform communication. When the discovery process is applied to operation 210, the short-range wireless communicator of the entrance management system, for example, the UWB sensor, and the electronic device 100 may transmit a search signal for searching for a counterpart device to each other, and when the UWB sensor detects the search signal of the electronic device 100, may identify the presence of the electronic device 100.

In operation 220, the entrance management system may measure a distance from the electronic device 100. In an embodiment, the entrance management system may measure the distance from the electronic device 100 by using the short-range wireless communicator. The short-range wireless communicator of the entrance management system may transmit a signal for distance measurement and measure the distance from the electronic device 100 based on the transmitted signal, or may receive a signal from the electronic device 100 and measure the distance from the electronic device 100 based on the received signal. For example, the entrance management system may perform ranging by using the short-range wireless communicator. In more detail, the entrance management system may transmit a signal for distance measurement to the electronic device 100 by using the short-range wireless communicator, and may measure the distance from the electronic device 100 by using a response, a reflected wave, etc. Also, the distance from the electronic device 100 may be measured based on the strength of the signal received from the electronic device 100, for example, a received signal strength indicator (RSSI).

In an embodiment, a distance between the sensor for short-range wireless communication, for example, the UWB sensor, and the electronic device 100 may be measured. The position of the electronic device 100 may be identified according to the number and type of sensors for short-range wireless communication.

In operation 230, when the electronic device 100 enters a set first range, the entrance management system may open an entrance. In more detail, the entrance management system may continuously measure the distance from the electronic device 100, and when the electronic device 100 enters the set first range, may open the entrance. In an embodiment, the first range may include a range in which the entrance 30 is opened when the electronic device 100 is positioned therewithin. The first range may be set according to the type and size of the entrance 30, performance of the short-range wireless communicator, an entrance management policy, etc.

According to an embodiment, when a user of the electronic device 100 enters a certain range around the entrance, the entrance management system may open the entrance upon determining that the user of the electronic device 100 intends to enter the entrance.

In operation 240, when the distance from the electronic device 100 decreases to a preset value or less, the entrance management system may close the entrance. In more detail, the entrance management system may continuously measure the distance from the electronic device 100, and when the distance from the electronic device 100 decreases to the preset value or less, may close the entrance. In an embodiment, the sensor for short-range wireless communication of the entrance management system, for example, the UWB sensor, may be positioned inside the entrance. In more detail, the UWB sensor may be positioned at the center of an internal space of the entrance.

According to an embodiment, when the UWB sensor and the electronic device 100 are close to each other by a certain distance or less, the user of the electronic device 100 may close the opened entrance again upon determining that the user enters the entrance.

In an embodiment, when the distance from the electronic device 100 increases, the entrance management system may immediately close the entrance. In more detail, when the distance from the electronic device 100 increases in a state in which the electronic device 100 enters the set first range and the entrance is opened, the entrance management system may immediately close the entrance. In an embodiment, even when the electronic device 100 is out of the first range, the entrance management system may immediately close the entrance.

According to an embodiment, when the distance from the electronic device 100 increases, the entrance management system may determine that the user of the electronic device 100 does not intend to enter the entrance and may quickly close the entrance to restrict access of unauthorized users. Accordingly, the entrance management system according to the embodiment of the disclosure may improve security.

In addition, in an embodiment, after the entrance is immediately closed, when a user is detected inside the entrance, the entrance management system may perform a processing procedure for the user. In an embodiment, the entrance management system may include an additional sensor unit other than the short-range wireless communicator, to detect the user inside the entrance. In this case, the sensor unit may include at least one of a camera, a motion sensor, a magnetic sensor, an acceleration sensor, a temperature/humidity sensor, an infrared sensor, a gyroscope sensor, a position sensor, an atmospheric pressure sensor, a proximity sensor, a pressure sensor, and a red-green-blue (RGB) (luminance) sensor, but is not limited thereto. The entrance management system may determine whether the user is inside the entrance by using the sensor unit.

In an embodiment, the entrance management system may transmit an alarm indicating that an unauthorized user enters the entrance to a system manager or the electronic device 100, as a procedure for dealing with the unauthorized user. Also, a warning message or a message for requesting the user to leave the entrance may be output to the user by using an output device such as a display, a speaker, etc. inside the entrance.

According to an embodiment, the entrance management system quickly closes the entrance upon determining that the user of the electronic device 100 does not intend to enter the entrance, but when the unauthorized user enters the entrance before the entrance is closed, the entrance management system may perform a procedure for dealing with the user. Accordingly, the entrance management system according to the embodiment of the disclosure may improve security.

In addition, according to an embodiment, when a certain time elapses after the entrance is opened, the entrance management system may close the entrance. In more detail, regardless of whether the user of the electronic device 100 enters the entrance, the entrance management system may close the entrance after a set time elapses to maintain security.

Furthermore, in an embodiment, the entrance management system may perform an authentication procedure on an electronic device and/or a user of the electronic device. In an embodiment, the entrance management system may perform an authentication procedure after the electronic device 100 is detected in operation 210.

According to an embodiment, the entrance management system may manage only an authenticated electronic device and/or user to pass through the entrance by performing authentication on the electronic device 100 and/or the user of the electronic device 100.

According to an embodiment, a convenient entrance management system, with improved security, using short-range wireless communication and an operating method thereof may be provided.

This will be described in more detail below with reference to FIGS. 3 and 4.

Figure 3:
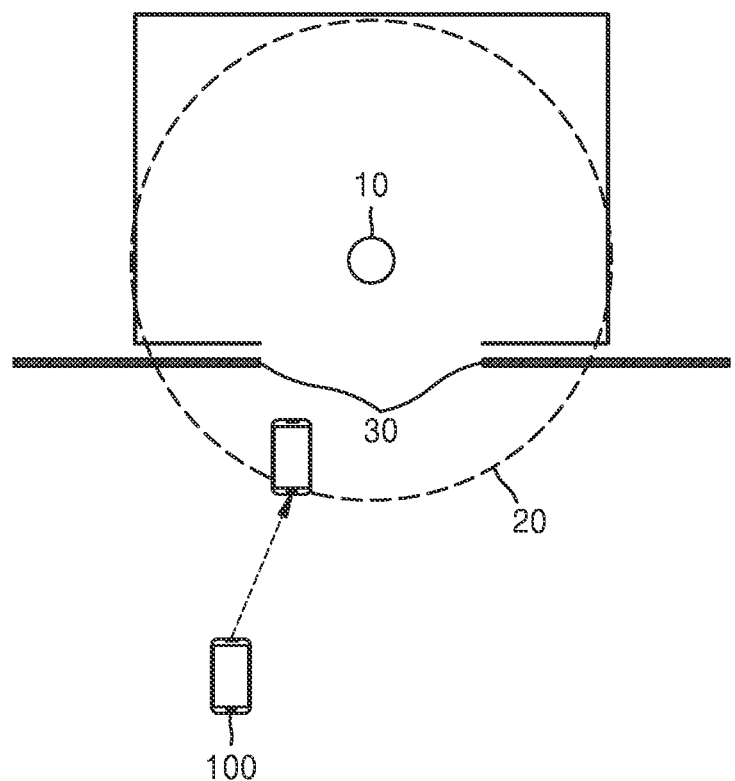
FIG. 3 is a diagram for describing an operating method of an entrance management system, according to an embodiment of the disclosure.

FIG. 3 is a diagram for describing the operating method of the entrance management system, according to an embodiment of the disclosure.

Referring to FIG. 3, when the electronic device 100 approaches the entrance 30, a UWB sensor 10 may detect the electronic device 100 by receiving a signal transmitted by the electronic device 100. In an embodiment, the UWB sensor 10 may detect the electronic device 100 through a discovery process with the electronic device 100. The UWB sensor 10 may generate a link after the discovery process with the electronic device 100 and may communicate with the electronic device 100. Thereafter, the entrance management system may manage only a user of an authenticated electronic device to pass through the entrance 30 by performing authentication on the electronic device 100 and/or the user of the electronic device 100.

The entrance management system that has detected the authenticated electronic device 100 may measure a distance between the UWB sensor 10 and the authenticated electronic device 100 by performing ranging, and may open the entrance 30 when the authenticated electronic device 100 enters a set range. That is, when the authenticated electronic device 100 enters with the set range, the entrance management system may open the entrance 30 upon determining that a user of the authenticated electronic device 100 intends to enter the entrance 30.

Thereafter, when the distance between the UWB sensor 10 and the authenticated electronic device 100 decreases to a preset value or less, the entrance management system may close the entrance. The UWB sensor 10 may be positioned at the center of the internal space of the entrance, and when the UWB sensor 10 and the authenticated electronic device 100 are close to each other by a certain distance or less, the entrance management system may close the opened entrance 30 again upon determining that the user of the authenticated electronic device 100 enters the entrance 30. Alternatively, regardless of whether the user of the authenticated electronic device 100 enters the entrance, the entrance management system may close the entrance 30 after a set time elapses to maintain security.

Figure 4:
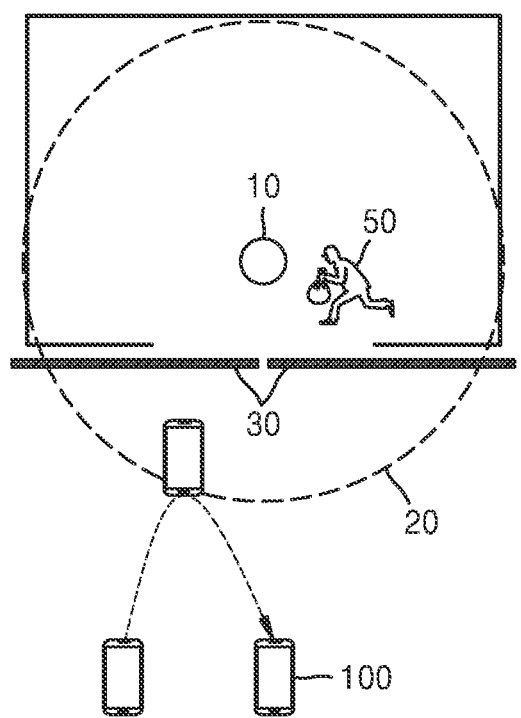
FIG. 4 is a diagram for describing an operating method of an entrance management system, according to an embodiment of the disclosure.

FIG. 4 is a diagram for describing the operating method of the entrance management system, according to an embodiment of the disclosure.

Referring to FIG. 4, when the distance between the UWB sensor 10 and the authenticated electronic device 100 increases, the entrance management system may immediately close the entrance. Also, even when the authenticated electronic device 100 is out of the set range 20, the entrance management system may immediately close the entrance. When the user of the authenticated electronic device 100 leaves the perimeter of the entrance 30, the entrance management system may determine that the user does not intend to enter the entrance 30 and may quickly close the entrance to restrict access of unauthorized users.

When the user is detected inside the entrance 30 after the entrance 30 is immediately closed, the entrance management system may perform a procedure for dealing with the user. According to an embodiment, the entrance management system quickly closes the entrance 30 upon determining that the user of the authenticated electronic device 100 does not intend to enter the entrance 30, but when an unauthorized user enters the entrance 30 before the entrance 30 is closed, the entrance management system may perform a procedure for dealing with the unauthorized user. In more detail, the entrance management system may transmit, to the electronic device 100 or the like, an alarm indicating that the unauthorized user enters the entrance 30, or may output, to the user, a warning message or a message for requesting the user to leave the entrance by using an output device such as a display, a speaker, etc. inside the entrance 30.

As described with reference to FIGS. 2 to 4, the entrance management system may detect the electronic device 100 and open an entrance door when the electronic device 100 is positioned within a set range around the entrance door. In the case of a facility used by a plurality of users, a plurality of users may be positioned around the entrance door. In this case, the plurality of users may include various users such as the user of the authenticated electronic device 100, a user related to a user of an authenticated electronic device, an unauthenticated user, etc. When the user of the authenticated electronic device 100 among the plurality of users is positioned around the entrance door, that is, within the first range, the entrance may be opened. It may be difficult to control visitors when the entrance is opened at the facility used by the plurality of users by the user of the authenticated electronic device 100. Therefore, in this case, an entrance management system for managing an entrance and an operating method thereof are required.

Figure 5:
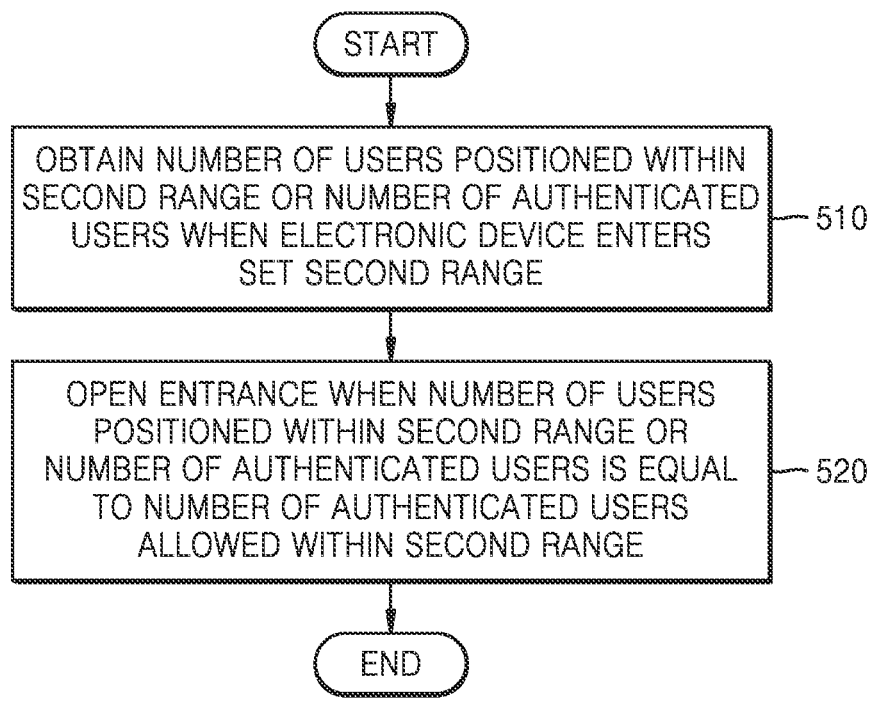
FIG. 5 is a flowchart for describing an operating method of an entrance management system, according to another embodiment of the disclosure.

FIG. 5 is a flowchart for describing the operating method of the entrance management system, according to another embodiment of the disclosure.

In operation 510, when an electronic device enters a set second range, the entrance management system may obtain at least one of the number of users positioned within the second range or the number of authenticated users. In an embodiment, the entrance may include a first entrance that is an external entrance and a second entrance that is an internal entrance, and the second range may be formed by physical barriers between the first entrance and the second entrance. In this regard, the physical barriers may include walls, partition walls, barriers, barrier fences, etc. In this case, the second range refers to an area from a point after passing the first entrance to a point before passing the second entrance. However, the embodiment is not limited thereto, and the second range may be formed outside one entrance. Also, the second range may include the first range described with reference to FIGS. 2 to 4, may be included in the first range, or may partially overlap the first range.

In an embodiment, the entrance management system may obtain the number of authenticated users, that is, the number of users of authenticated electronic devices, by using the short-range wireless communicator. Also, the entrance management system may include an additional sensor unit other than the short-range wireless communicator, to obtain the number of users positioned within the second range. In this case, the sensor unit may include at least one of a camera, a motion sensor, a geomagnetic sensor, an acceleration sensor, a temperature/humidity sensor, an infrared sensor, a gyroscope sensor, a position sensor, an atmospheric pressure sensor, a proximity sensor, a pressure sensor, and an RGB sensor, but is not limited thereto. In an embodiment, the entrance management system may obtain the total number of users positioned within the second range by using the sensor unit.

In an embodiment, the entrance management system may obtain at least one of the number of users positioned in the second range or the number of authenticated users in every set time or every time the number of users positioned within the second range changes.

Thereafter, in operation 520, the entrance management system may open the entrance when the number of users positioned within the second range and/or the number of authenticated users are equal to the number of authenticated users allowed within the second range. In an embodiment, the entrance management system may open the entrance when only a user of an authenticated electronic device is positioned within the second range. In this case, when the entrance management system includes the first entrance that is the external entrance and the second entrance that is the internal entrance, the second range is formed between the first entrance and the second entrance, and thus, the entrance management system may open the second entrance. Also, the entrance management system may close the first entrance before opening the second entrance, to control unauthorized users.

When a plurality of users attempt to pass through the entrance, all users may be authenticated and pass through the entrance, or only one or some users may be authenticated, and users related to the users of the authenticated electronic devices may pass through the entrance together. In more detail, the entrance management system may group at least one additional user with one user of an authenticated electronic device and open the entrance for a plurality of users. For example, when the entrance management system allows up to two accompanying persons to pass through the entrance for one authenticated user, and three users including the user of the authenticated electronic device are positioned within the second range, the entrance management system may open the entrance. In this case, accompanying persons are not necessarily specified, and only the number of accompanying persons may be set.

In addition, according to an embodiment, the entrance management system may not open the entrance when the number of users positioned within the second range and/or the number of authenticated users are not equal to the number of authenticated users allowed within the second range. In this case, the entrance management system may not open the entrance upon determining that an unauthenticated user is positioned in the second range. In an embodiment, the entrance management system may transmit an alarm indicating that an unauthorized user is inside a second area to the system manager or the authenticated electronic device 100, or may output, to the user, a warning message or a message for requesting the user to leave the entrance by using an output device such as a display, a speaker, etc. inside the second area.

According to an embodiment, the entrance management system includes the first entrance that is the external entrance and the second entrance that is the internal entrance, and the second range is formed by using the physical barriers between the first entrance and the second entrance, and thus, a plurality of users may be quickly and efficiently controlled by using the number of users positioned in the second range.

This will be described in detail below with reference to FIGS. 6 to 9.

Figure 6:
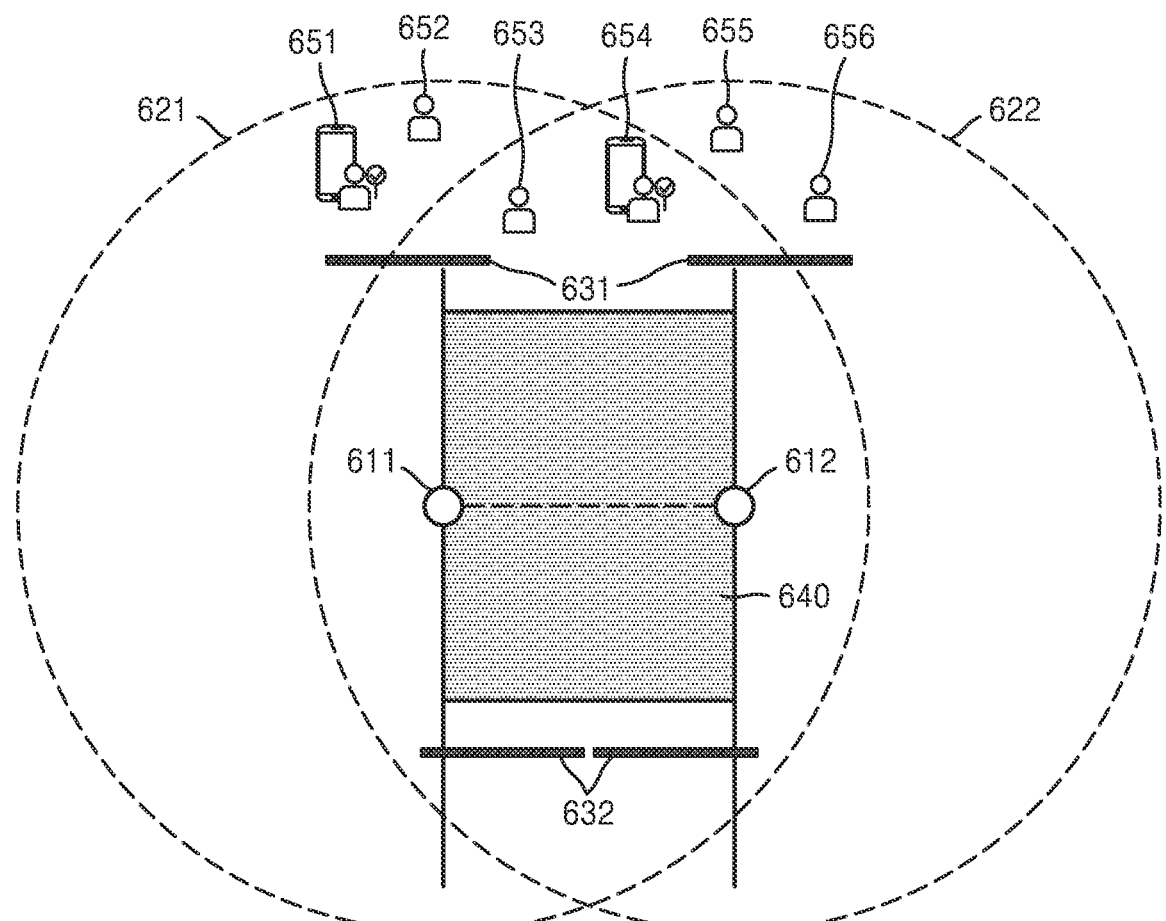
FIG. 6 is a diagram for describing an operating method of an entrance management system, according to another embodiment of the disclosure.

FIG. 6 is a diagram for describing the operating method of the entrance management system, according to another embodiment of the disclosure.

Referring to FIG. 6, a second range 640 is formed between a first entrance 631 and a second entrance 632. In more detail, the second range 640 is formed by the first entrance 631, the second entrance 632, and physical barriers positioned on left and right sides. In this case, the physical barriers may include walls, partition walls, barriers, barrier fences, etc. Also, two UWB sensors 611 and 612 for measuring a distance and/or a position of an electronic device may be positioned between the first entrance 631 and the second entrance 632. The two UWB sensors 611 and 612 may be positioned on left and right barriers in a middle portion between the first entrance 631 and the second entrance 632. The two UWB sensors 611 and 612 have sensing ranges 621 and 622, respectively, and when the electronic device 100 is positioned therewithin, a first range that is a range in which the entrance 30 is opened may be set by using the two UWB sensors 611 and 612. The first range may include both the sensing ranges 621 and 622 of the two UWB sensors 611 and 612 or may include an area in which the sensing ranges 621 and 622 of the two UWB sensors 611 and 612 overlap each other.

In the case of a facility used by a plurality of users, a plurality of users 651, 652, . . . , 656 may be positioned around an entrance door. In this case, the plurality of users 651, 652, . . . , 656 may include various users such as users 651 and 654 of authenticated electronic devices, users 652 and 653 related to users of authenticated electronic devices, and unauthenticated users 655 and 656. Among the plurality of users, when the users 651 and 654 of the authenticated electronic devices are positioned around the entrance door, that is, within the first range, the entrance may be opened.

In more detail, when the electronic device 100 approaches the first entrance 631, the entrance management system may detect the electronic device 100 by using the UWB sensors 611 and 612. Thereafter, the entrance management system may manage only the users 651 and 654 of the authenticated electronic devices to pass through the first entrance 631 by performing authentication on the electronic device 100 and/or the user of the electronic device 100. In this case, the entrance management system may set users related to the users 651 and 654 of the authenticated electronic devices to pass through the entrance together with the users 651 and 654 of the authenticated electronic devices. For example, when the user 654 of the authenticated electronic device is with two accompanying persons 652 and 653, the entrance management system may set up to two accompanying persons 652 and 653 to be allowed to pass through the entrance together with the user 654 of the authenticated electronic device. In this case, the accompanying persons 652 and 653 are not necessarily specified, and only the number of accompanying persons may be set.

The entrance management system that has detected the authenticated electronic device 100 may measure a distance between the UWB sensors 611 and 612 and the authenticated electronic device 100 by performing ranging, and may open the first entrance 631 when the electronic device 100 enters a set first range. That is, when the authenticated electronic device 100 enters the set first range, the entrance management system may open the first entrance 631 upon determining that the users 651 and 654 of the authenticated electronic devices intend to enter the entrances 631 and 632.

However, it may be difficult to control visitors when an entrance of a facility used by a plurality of users is opened. Accordingly, in this case, the entrance management system once opens only the first entrance 631 and maintains the second entrance 632 in a closed state to manage the entrance. In this regard, when the UWB sensors 611 and 612 and the authenticated electronic device 100 are close to each other by a certain distance or less, the entrance management system may close the opened first entrance 631 again upon determining that the user of the authenticated electronic device 100 enters the first entrance 631. Alternatively, regardless of whether the user of the authenticated electronic device 100 enters the entrance, the entrance management system may close the first entrance 631 after a set time elapses to maintain security.

An operation related to the opening of the second entrance 632 will be described with reference to FIG. 7.

Figure 7:
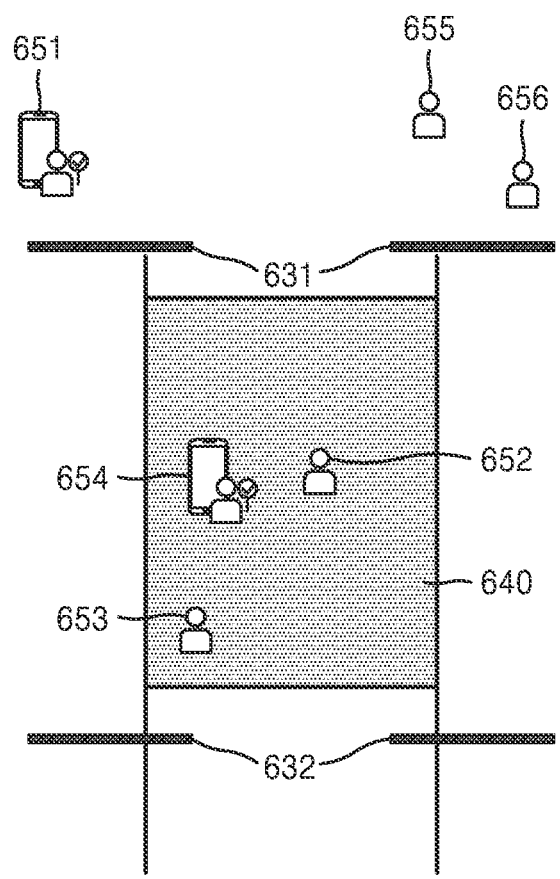
FIG. 7 is a diagram for describing an operating method of an entrance management system, according to another embodiment of the disclosure.

FIG. 7 is a diagram for describing the operating method of the entrance management system, according to another embodiment of the disclosure.

When the user 654 of the authenticated electronic device enters the set second range 640, the entrance management system may obtain at least one of the number of users positioned within the second range 640 or the number of authenticated users. In an embodiment, the entrance management system may obtain the number of authenticated users, that is, the number of users of authenticated electronic devices, by using the short-range wireless communicator, and may obtain the total number of users positioned within the second range by using the sensor unit. Thereafter, the entrance management system may open the second entrance 632 when the number of users positioned within the second range 640 and/or the number of authenticated users are equal to the number of authenticated users allowed within the second range 640.

Referring to FIG. 7, the user 654 of the authenticated electronic device and the users 652 and 653 related to the user 654 of the authenticated electronic device are positioned within the second range 640. As described with reference to FIG. 6, the entrance management system may set a total of three persons including up to two accompanying persons 652 and 653 to be allowed to pass through the entrance together with the user 654 of the authenticated electronic device during device and/or user authentication. In FIG. 7, a total of three persons including the user 654 of the authenticated electronic device and up to two accompanying persons allowed for the user 654 of the authenticated electronic device are positioned within the second range 640. The number of users positioned within the second range 640 is equal to the number of authenticated users allowed within the second range 640. Therefore, the entrance management system may open the second entrance 632. Also, the entrance management system may close the first entrance 631 before opening the second entrance 632, to control unauthorized users.

Figure 8:
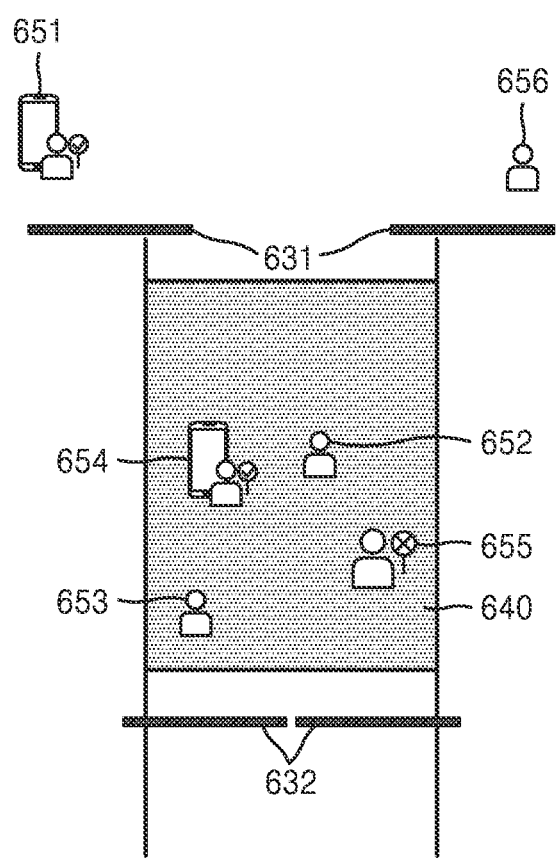
FIG. 8 is a diagram for describing an operating method of an entrance management system, according to another embodiment of the disclosure.

FIG. 8 is a diagram for describing the operating method of the entrance management system, according to another embodiment of the disclosure.

The entrance management system may not open the second entrance 632 when the number of users positioned within the second range 640 and/or the number of authenticated users are not equal to the number of authenticated users allowed within the second range 640.

Referring to FIG. 8, the entrance management system sets a total of three persons including up to two accompanying persons 652 and 653 to be allowed to pass through the entrance together with the user 654 of the authenticated electronic device during device and/or user authentication, but a total of four persons including the user 654 of the authenticated electronic device, the two accompanying persons 652 and 653, and the unauthorized user 655 are positioned within the second range 640. Therefore, the entrance management system may not open the second entrance 632 to control unauthorized users. Also, the entrance management system may transmit an alarm indicating that an unauthorized user is inside the second range 640 to the system manager or the authenticated electronic device 100, or may output, to the user, a warning message or a message for requesting the user to leave the first entrance 631 by using an output device such as a display, a speaker, etc. inside the second range 640.

Figure 9:
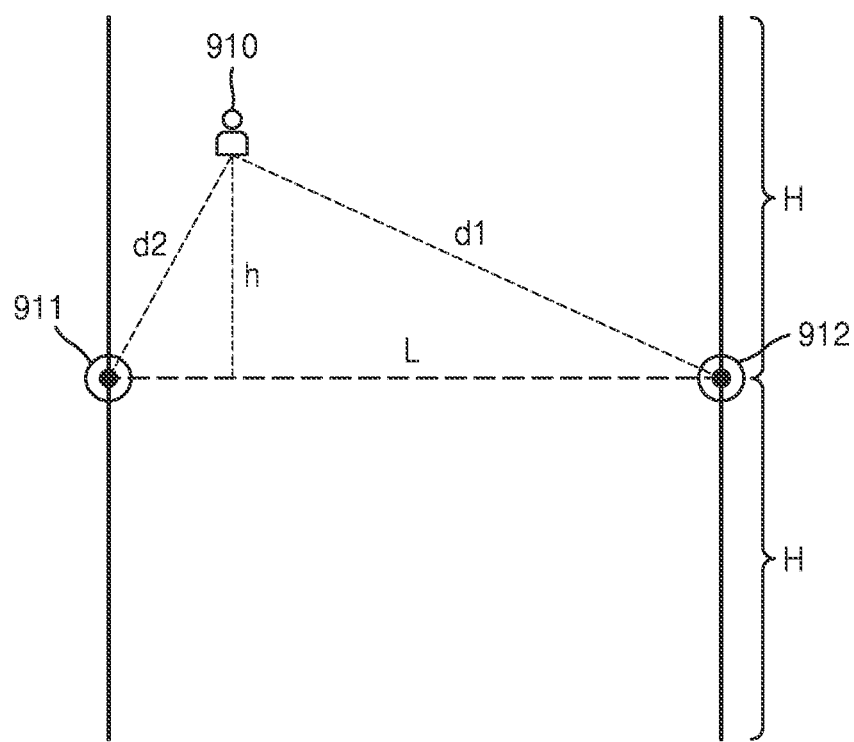
FIG. 9 is a diagram for describing an operating method of an entrance management system, according to another embodiment of the disclosure.

FIG. 9 is a diagram for describing the operating method of the entrance management system, according to another embodiment of the disclosure.

Referring to FIG. 9, a method of determining whether an authenticated electronic device is positioned in the second range by using UWB sensors will be described. By using the method, the entrance management system may obtain the number of authenticated electronic devices positioned in the second range.

A length of a second area is 2H, and UWB sensors 911 and 912 are positioned in a middle portion of physical barriers positioned on the left and right sides, respectively. Also, when a distance between the UWB sensors 911 and 912 is L, a distance between the first UWB 911 and a user 910 is d2, and a distance between the second UWB sensor 912 and the user 910 is d1, a vertical distance h from a line connecting the UWB sensors 911 and 912 to the user 910 may be calculated through Equation 1 as follows.

$$h = \frac{1}{2L} \sqrt{(d1+d2+L)(-d1+d2+L)(d1-d2+L)(d1+d2-L)} \qquad \text{Equation 1}$$

When h calculated through [Equation 1] is less than H, that is, when h<H, it may be determined that a user of the authenticated electronic device is positioned in the second range.

Figure 10:
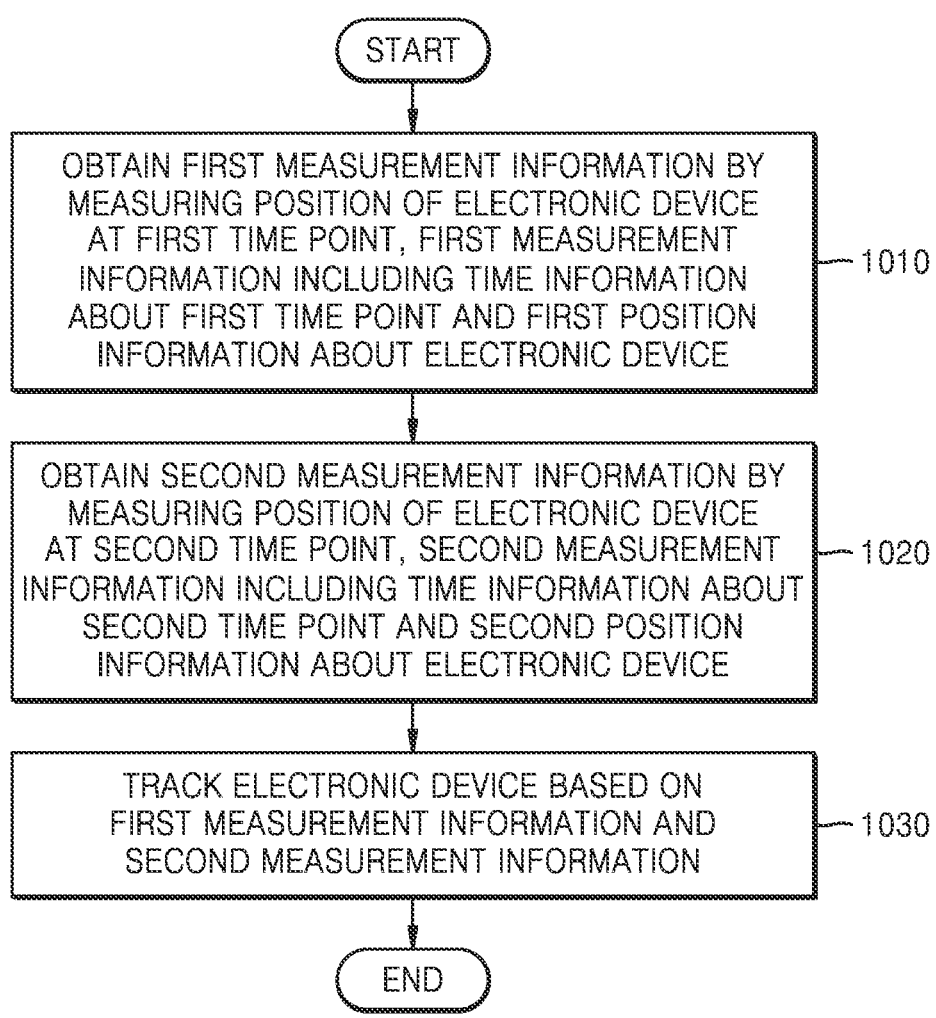
FIG. 10 is a flowchart for describing an operating method of an entrance management system, according to another embodiment of the disclosure.

FIG. 10 is a flowchart for describing the operating method of the entrance management system, according to another embodiment of the disclosure.

In operation 1010, the entrance management system may obtain first measurement information including time information about a first time point and first position information about an electronic device by measuring a position of the electronic device at the first time point. In this case, the entrance management system may measure the position of the electronic device through trilateration using at least three fixed sensors. In this regard, the at least three fixed sensors may be connected to an entrance management system sensor by wire or wirelessly. When the fixed sensors and the entrance management system server are wirelessly connected, a latency error may occur due to a network delay. According to an embodiment, when the first measurement information is obtained, the first measurement information including, as time information, the first time point at which the first position information is obtained is obtained, and thus, problems caused by the latency error may not occur.

In an embodiment, the entrance management system may already identify the coordinates of the at least three fixed sensors, and thus may measure an absolute position, that is, coordinate values, of the electronic device through trilateration.

In operation 1020, the entrance management system may obtain second measurement information including time information about a second time point and second position information about the electronic device by measuring the position of the electronic device at the second time point. In this case, the entrance management system may measure the absolute position of the electronic device through trilateration using the at least three fixed sensors.

In operation 1030, the entrance management system may track the electronic device based on the first measurement information and the second measurement information. In an embodiment, the entrance management system may identify where the electronic device was positioned at the first time point and where the electronic device was positioned at the second time point based on the first measurement information and the second measurement information, and thus may track the movement of the electronic device.

Though it has been described in FIG. 10 that the first measurement information and the second measurement information are used, the embodiment is not limited thereto, and the electronic device may be tracked by using a greater number of pieces of measurement information. As the number of pieces of measurement information increases, the tracking accuracy may be improved. Also, as a time interval between the first time point at which a first position is measured and the second time point at which a second position is measured decreases, the tracking accuracy may be improved. Furthermore, as described with reference to FIG. 10, when the absolute position of the electronic device is measured through trilateration, the electronic device may be accurately tracked regardless of whether the electronic device moves.

Figure 11:
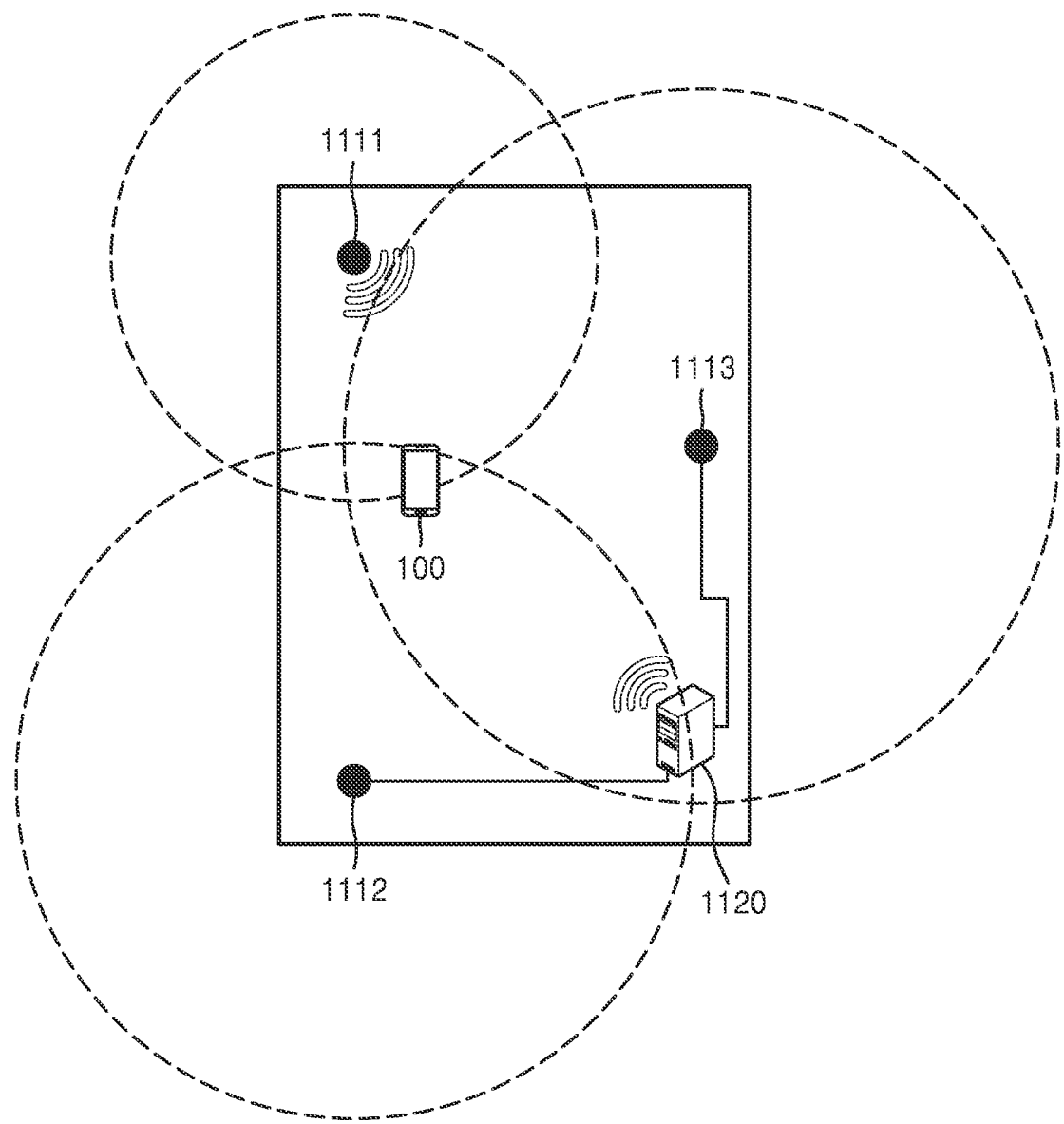
FIG. 11 is a diagram for describing an operating method of an entrance management system, according to another embodiment of the disclosure.

FIG. 11 is a diagram for describing the operating method of the entrance management system, according to another embodiment of the disclosure.

Referring to FIG. 11, three fixed UWB sensors 1111, 1112, and 1113 are positioned within a limited space. Among the three fixed UWB sensors 1111, 1112, and 1113, two UWB sensors 1112 and 1113 are connected to an entrance management system server 1120 by wire, and one UWB sensor 1111 is wirelessly connected to the entrance management system server 1120. When the UWB sensor is wirelessly connected to the entrance management system server, a latency error may occur due to a network delay. According to an embodiment, when measurement information is obtained, measurement information including, as time information, a time point at which position information is obtained is obtained, and thus, problems caused by the latency error may not occur.

In an embodiment, the entrance management system may obtain first measurement information including time information about a first time point and first position information about the electronic device 100 and obtain second measurement information including time information about a second time point and second position information about the electronic device 100, by measuring the position of the electronic device 100 at the first time point by using the three fixed UWB sensors 1111, 1112, and 1113. The measurement information obtained through the aforementioned process includes coordinate values of the electronic device 100 for each time period. Therefore, the entrance management system may track the electronic device based on the obtained measurement information.

Figure 12:
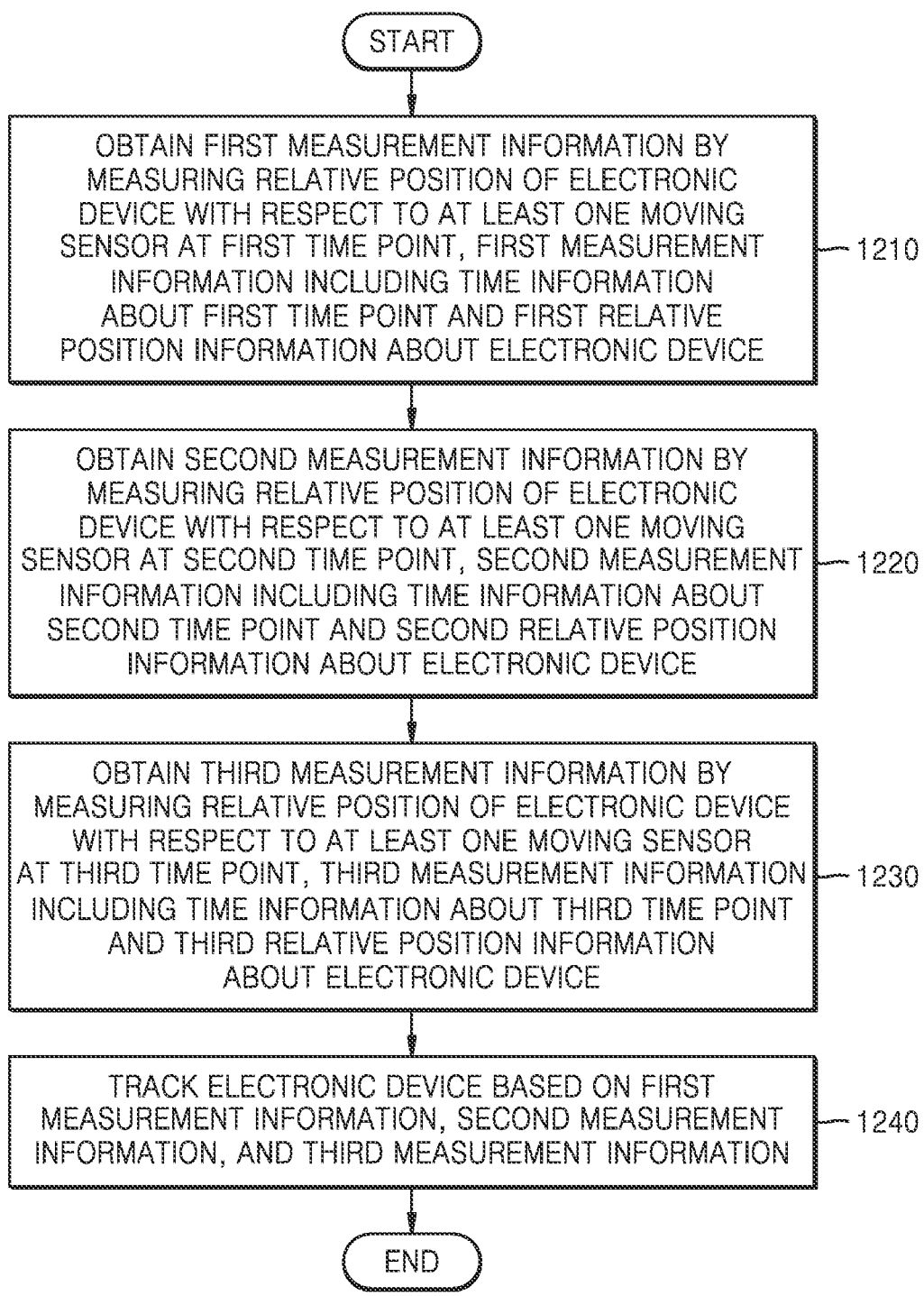
FIG. 12 is a flowchart for describing an operating method of an entrance management system, according to another embodiment of the disclosure.

FIG. 12 is a flowchart for describing the operating method of the entrance management system, according to another embodiment of the disclosure.

In operation 1210, the entrance management system may obtain first measurement information including time information about a first time point and first relative position information about the electronic device by measuring a relative position of the electronic device with respect to at least one moving sensor at the first time point. In this case, the entrance management system may measure the position of the electronic device through trilateration using the at least one moving sensor. In an embodiment, the entrance management system uses the at least one moving sensor, and thus may measure the relative position of the electronic device with respect to the at least one moving sensor, rather than the absolute position of the electronic device.

In operation 1220, the entrance management system may obtain second measurement information including time information about a second time point and second relative position information about the electronic device by measuring a relative position of the electronic device with respect to the at least one moving sensor at the second time point. In this case, the entrance management system may measure the relative position of the electronic device with respect to the at least one moving sensor by using the at least one moving sensor.

In an embodiment, the entrance management system may obtain second sensor position information at the second time point. In more detail, the entrance management system may obtain the second sensor position information, which is position information about the moving sensor at the second time point, based on first sensor position information, which is position information about the moving sensor at the first time point, and movement information about the moving sensor. Also, the movement information about the moving sensor may include a movement direction and a movement speed of the sensor, an expected position of the sensor at the second time point, etc. The movement information about the moving sensor may be set by the entrance management system. In an embodiment, the sensor moves over time, and thus, the entrance management system needs to obtain position information about the moving sensor at the second time point to obtain the second measurement information. The entrance management system may measure a second relative position of the electronic device with respect to the at least one moving sensor based on the second sensor position information obtained through the aforementioned process.

In an embodiment, the entrance management system may estimate a positional movement of the electronic device or a movement speed of the electronic device and may reflect a compensation value according to the positional movement or the movement speed in the second relative position information. According to an embodiment, when the electronic device is not fixed and moves, the entrance management system may measure a relative position of the electronic device with respect to a second sensor position of the at least one moving sensor at the first time point and/or a third time point by reflecting the compensation value according to the positional movement or the movement speed of the electronic device in the second relative position information.

In operation 1230, the entrance management system may obtain third measurement information including time information about the third time point and third relative position information about the electronic device by measuring a relative position of the electronic device with respect to the at least one moving sensor at the third time point. In this case, the entrance management system may measure the relative position of the electronic device with respect to the at least one moving sensor by using the at least one moving sensor.

In an embodiment, the entrance management system may obtain third sensor position information at the third time point. In more detail, the entrance management system may obtain the third sensor position information, which is position information about the moving sensor at the third time point, based on the second sensor position information, which is the position information about the moving sensor at the second time point, and movement information about the moving sensor. Also, the movement information about the moving sensor may include a movement direction and a movement speed of the sensor, an expected position of the sensor at the third time point, etc. The movement information about the moving sensor may be set by the entrance management system. In an embodiment, the sensor moves over time, and thus, the entrance management system needs to obtain position information about the moving sensor at the third time point to obtain the third measurement information. The entrance management system may measure a third relative position of the electronic device with respect to the at least one moving sensor based on the second sensor position information obtained through the aforementioned process.

In an embodiment, the entrance management system may estimate a positional movement of the electronic device or a movement speed of the electronic device and may reflect a compensation value according to the positional movement or the movement speed in the third relative position information. According to an embodiment, when the electronic device is not fixed and moves, the entrance management system may measure a relative position of the electronic device with respect to a third sensor position of the at least one moving sensor at the first time point and/or the second time point by reflecting the compensation value according to the positional movement or the movement speed of the electronic device in the third relative position information.

In operation 1240, the entrance management system may track the electronic device based on the first measurement information, the second measurement information, and the third measurement information. In more detail, the entrance management system may track the electronic device through trilateration based on the first measurement information, the second measurement information, and the third measurement information. According to an embodiment, the movement information about the sensor may be set by the entrance management system, and thus, the first sensor position information at the first time point, the second sensor position information at the second time point, and the third sensor position information at the third time point may be obtained as absolute positions, that is, coordinate values. Therefore, an absolute position of the electronic device at each time point may be calculated by using sensor position information, which is an absolute position, and a relative position of the electronic device with respect to a sensor position. As a result, the entrance management system may track the electronic device based on the position of the electronic device at each time point.

Though it has been described in FIG. 12 that the first measurement information, the second measurement information, and the third measurement information are used, the embodiment is not limited thereto, and the electronic device may be tracked by using a greater number of pieces of measurement information. As the number of pieces of measurement information increases, the tracking accuracy may be improved. Also, by reflecting the compensation value according to the positional movement or the movement speed of the electronic device in relative position information, even though the electronic device moves, the electronic device may be accurately tracked by using one moving sensor.

Figure 13:
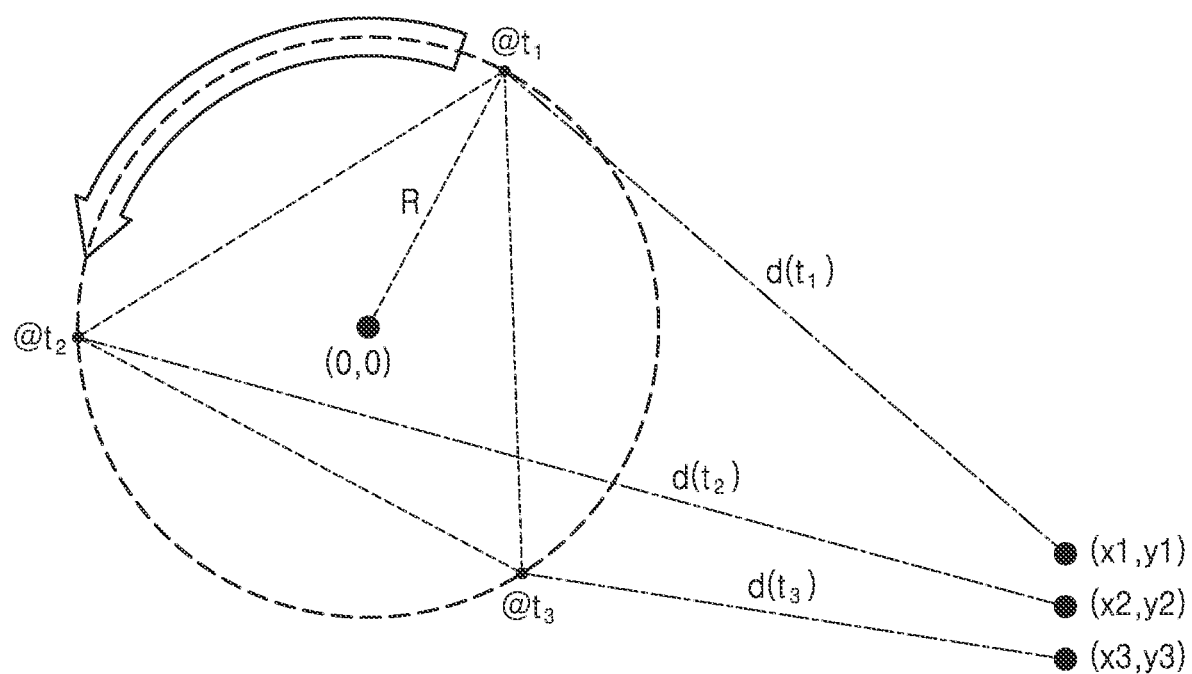
FIG. 13 is a diagram for describing an operating method of an entrance management system, according to another embodiment of the disclosure.

FIG. 13 is a diagram for describing the operating method of the entrance management system, according to another embodiment of the disclosure.

Referring to FIG. 13, a distance between the UWB sensor and the electronic device at a first time point @$t_1$ is d($t_1$), a distance between the UWB sensor and the electronic device at a second time point @$t_2$ is d($t_2$), and a distance between the UWB sensor and the electronic device at a third time point @$t_3$ is d($t_3$). In this case, the UWB sensor may measure not only the distance but also the direction, and thus, the entrance management system may measure a relative position of the electronic device with respect to the UWB sensor at each of the first time point, the second time point, and the third time point.

Movement information about the moving sensor including a movement direction and a movement speed of the sensor, an expected position of the sensor at the second time point, etc. may be set by the entrance management system. Accordingly, the entrance management system may obtain second sensor position information at the second time point based on first sensor position information at the first time point. In this case, the second sensor position information may be a relative position with respect to the first sensor position information. Also, the entrance management system may obtain third sensor position information at the third time point based on the second sensor position information at the second time point. In this case, the third sensor position information may be a relative position with respect to the second sensor position information. As described above, the movement information of the moving sensor including the movement direction and the movement speed of the sensor, the expected position of the sensor at the second time point, etc. is set by the entrance management system, and thus, the entrance management system may identify an absolute position of the moving sensor at the first time point. Therefore, when the second sensor position information and the third sensor position information are calculated based on the first sensor position information, absolute positions of the sensor at the second time point and the third time point may be obtained.

Like the sensors, the electronic device may also move. In FIG. 13, the absolute position of the electronic device changes to (x1, y1), (x2, y2), and (x3, y3) over time. To track the electronic device through trilateration, a position of the same target needs to be measured at three different positions at one time point. Therefore, when the electronic device moves, compensation according to the positional movement or the movement speed of the electronic device is required. Accordingly, the entrance management system may estimate the positional movement of the electronic device or the movement speed of the electronic device and may reflect a compensation value according to the positional movement or the movement speed in the second relative position information and the third relative position information. According to an embodiment, when the electronic device is not fixed and moves, the entrance management system may measure a relative position of the electronic device with respect to a position of the at least one moving sensor at the first time point, the second time point, or the third time point by reflecting the compensation value according to the positional movement or the movement speed of the electronic device in the second relative position information and the third relative position information.

Figure 14:
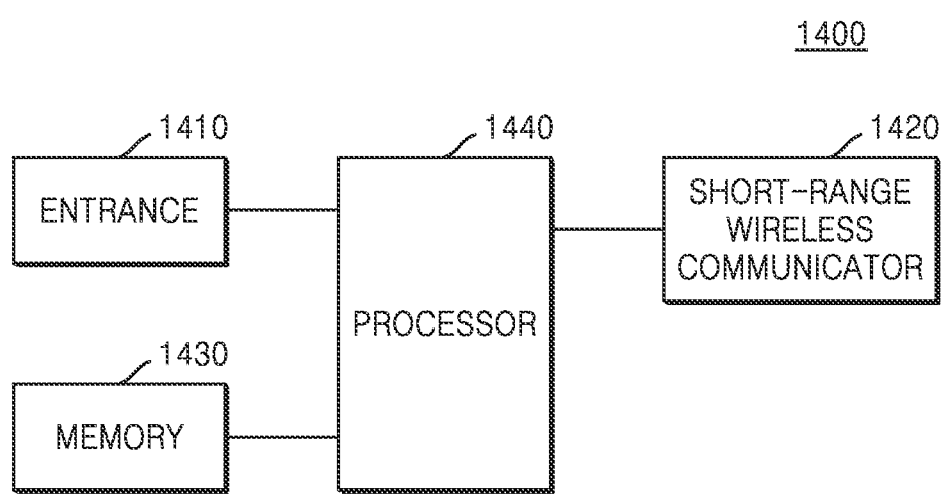
FIG. 14 is a block diagram of a configuration of an entrance management system, according to an embodiment of the disclosure.

FIG. 14 is a block diagram of a configuration of the entrance management system, according to an embodiment of the disclosure.

Referring to FIG. 14, an entrance management system 1400 according to an embodiment may include an entrance 1410, a short-range wireless communicator 1420, a memory 1430, and a processor 1440. However, not all of the illustrated components are essential. That is, the entrance management system 1400 may be implemented by more or fewer components than the components illustrated in FIG. 14. For example, though not illustrated in FIG. 14, the entrance management system 1400 may further include a sensor unit.

The entrance 1410 refers to a structure for entering or exiting a building, a specific place, etc. and controls visitors who intend to enter the building, the specific place, etc. In an embodiment, the entrance 1410 may include various types of opening/closing devices, and may control visitors by opening or closing the opening/closing devices under control by the processor 1440. In an embodiment, the entrance 1410 may include a door, a gate, a sliding door, a hinged door, a folding door, a revolving door, etc.

In an embodiment, the entrance 1410 may include a first entrance that is an external entrance and a second entrance that is an internal entrance.

The short-range wireless communicator 1420 may communicate with an external device. The short-range wireless communicator 1420 may transmit a signal or data received from the external device to the processor 1440, or may transmit a signal or data generated by the processor 1440 to the external device. For example, a short-range wireless communication module may be in the form of a chipset or may be a sticker/barcode (e.g., a sticker including an NFC tag) including information required for communication. In an embodiment, the short-range wireless communicator 10 may include a UWB communicator. The UWB may refer to the short-range high-speed wireless communication technology using a wide frequency band of several GHz or more, a low spectral density, and a short pulse width (1 nsec to 4 nsec) in a baseband state. The UWB may refer to the band itself to which UWB communication is applied. However, the short-range wireless communicator 10 may include an NFC unit, a WLAN (Wi-Fi) communicator, a Zigbee communicator, an IrDA communicator, a WFD communicator, an Ant+ communicator, an ultrasound communicator, etc., and is not limited thereto.

In an embodiment, the short-range wireless communicator 1420 may include a sensor for short-range wireless communication. In more detail, the short-range wireless communicator 1420 may include at least three fixed sensors. Also, the short-range wireless communicator 1420 may include at least one moving sensor.

The memory 1430 may store programs for processing and control by the processor 1440, and may store data input to or output from the entrance management system 1400. The programs stored in the memory 1430 may be classified into a plurality of modules according to functions thereof.

The memory 1430 may include a storage medium of at least one type of a flash memory type, a hard disk type, a multimedia card micro type, a card type memory (e.g., a secure digital (SD) or extreme digital (XD) memory), a random access memory (RAM), a static random access memory (SRAM), a read-only memory (ROM), an electrically erasable programmable read-only memory (EE-PROM), a programmable read-only memory (PROM), a magnetic memory, a magnetic disk, an optical disk, etc.

In an embodiment, the memory 1430 may store a program for operation of the entrance management system. Also, the memory 1430 may include at least one memory.

The processor 1440 may control an overall operation of the entrance management system 1400. For example, the entrance management system 1400 may control an overall process of executing the operation of the entrance management system by executing the programs stored in the memory 1430. The processor 1440 may include at least one processor.

In an embodiment, the processor 1440 may be configured to execute the program for the operation of the entrance management system 1400 stored in the memory 1430, to control detecting the electronic device by using the short-range wireless communicator 1420, measuring the distance from the electronic device, opening the entrance 1410 when the electronic device enters the set first range, and closing the entrance 1410 when the distance from the electronic device decreases to the preset value or less. Also, when the distance from the electronic device increases, the processor 1440 may be configured to control immediately closing the entrance. Furthermore, when a user is detected inside the entrance 1410 by using the sensor unit after the entrance 1410 is immediately closed, the processor 1440 may perform a procedure for dealing with the user.

In an embodiment, the processor 1440 may be configured to control performing an authentication procedure on the electronic device or the user of the electronic device.

In an embodiment, the processor 1440 may be configured to control obtaining the number of users positioned within the second range or the number of authenticated users when the electronic device enters the set second range, and opening the entrance 1410 when the number of users positioned within the second range or the number of authenticated users is equal to the number of authenticated users allowed within the second range. Also, when the number of users positioned within the second range or the number of authenticated users is not equal to the number of authenticated users allowed within the second range, the processor 1440 may be configured to control not opening the entrance 1410. In this case, the second range may be formed by physical barriers between the first entrance that is the external entrance and the second entrance that is the internal entrance.

In an embodiment, the processor 1440 may be configured to control tracking the electronic device through trilateration using the at least three fixed sensors. In more detail, the processor 1440 may be configured to obtain the first measurement information including time information about the first time point and first position information about the electronic device by measuring the position of the electronic device at the first time point, obtain the second measurement information including time information about the second time point and second position information about the electronic device by measuring the position of the electronic device at the second time point, and track the electronic device based on the first measurement information and the second measurement information.

In an embodiment, the processor 1440 may be configured to control tracking the electronic device through trilateration using the at least one moving sensor. In more detail, the processor 1440 may be configured to control obtaining the first measurement information including time information about the first time point and first relative position information about the electronic device by measuring a relative position of the electronic device with respect to the at least one moving sensor at the first time point, obtaining the second measurement information including time information about the second time point and second relative position information about the electronic device by measuring a relative position of the electronic device with respect to the at least one moving sensor at the second time point, obtaining the third measurement information including time information about the third time point and third relative position information about the electronic device by measuring a relative position of the electronic device with respect to the at least one moving sensor at the third time point, and tracking the electronic device based on the first measurement information, the second measurement information, and the third measurement information. Also, the processor 1440 may be configured to control obtaining the second sensor position information about the moving sensor at the second time point based on the first sensor position information about the moving sensor at the first time point and the movement information about the moving sensor, obtaining the third sensor position information about the moving sensor at the third time point based on at least one of the second sensor position information or the movement information about the moving sensor, and tracking the electronic device based on the first sensor position information, the second sensor position information, and the third sensor position information. Furthermore, the processor 1440 may be configured to control estimating the positional movement of the electronic device or the movement speed of the electronic device and reflecting the compensation value according to the positional movement or the movement speed in the second relative position information, and estimating the positional movement of the electronic device or the movement speed of the electronic device and reflecting the compensation value according to the positional movement or the movement speed in the third relative position information.

Though not illustrated in FIG. 14, the entrance management system 1400 may further include a sensor unit. The sensor unit may detect the state of the entrance management system 1400 or the state around the entrance management system 1400, and transmit the detected information to the processor 1440.

The sensor unit may include at least one of a camera, a motion sensor, a magnetic sensor, an acceleration sensor, a temperature/humidity sensor, an infrared sensor, a gyroscope sensor, a position sensor, an atmospheric pressure sensor, a proximity sensor, a pressure sensor, and an RGB (luminance) sensor, but is not limited thereto. Because functions of the sensors may be intuitively inferred by one of ordinary skill in the art from the names of the sensors, detailed descriptions thereof will be omitted.

In an embodiment, the sensor unit may detect a user inside the entrance. Also, the sensor unit may detect the number of users positioned within a set range, the number of authenticated users, etc.

Embodiments of the disclosure may be implemented with an S/W program including instructions stored in a computer-readable storage medium.

A computer may be a device for calling the instructions stored in the storage medium and performing, in response to the called instructions, operations according to the embodiments described above, and may include a user terminal, a device, a server, and an image processing apparatus according to the embodiments.

The computer-readable storage medium may be provided in the form of a non-transitory storage medium. The term "non-transitory" only means that a storage medium does not include a signal and is tangible, and does not distinguish whether data is stored in the storage medium semi-permanently or temporarily.

Also, the electronic device or the method according to the embodiments of the disclosure may be included in a computer program product. The computer program product may be a commercial product that may be traded between a seller and a buyer.

The computer program product may include a software program and a computer-readable storage medium having the software program stored therein. For example, the computer program product may include a product in the form of an S/W program that is electronically distributed by the manufacturer of the electronic device or by an electronic market (e.g., Google Play Store™, or App Store™). For the electronic distribution, at least a portion of the software program may be stored in a storage medium or arbitrarily generated. In this case, the storage medium may be a server of the manufacturer, a server of the electronic market, or a storage medium of a relay server that temporarily stores the S/W program.

The computer program product may include a storage medium of a server or a storage medium of a terminal in a system including the server and the terminal (e.g., an image transmission apparatus or an image reception apparatus). Alternatively, when there is a third device (e.g., a smartphone) connected to the server or the terminal for communication, the computer program product may include a storage medium of the third device. Alternatively, the computer program product may directly include an S/W program transmitted from the server to the terminal or the third device or transmitted from the third device to the terminal.

In this case, any one of the server, the terminal, and the third device may perform the method according to the embodiments of the disclosure by executing the computer program product. Alternatively, at least two of the server, the terminal, and the third device may perform the method according to the embodiments of the disclosure by executing the computer program product in a distributed fashion.

For example, the server (e.g., a cloud server or an artificial intelligence (AI) server) may execute the computer program product stored in the server to control the terminal connected to the server for communication to perform the method according to the embodiments of the disclosure.

As another example, the third device may execute the computer program product to control the terminal connected to the third device for communication to perform the method according to the embodiments of the disclosure. As a detailed example, the third device may remotely control the image transmission apparatus or the image reception apparatus to transmit or receive a packed picture.

When the third device executes the computer program product, the third device may download the computer program product from the server and execute the downloaded computer program product. Alternatively, the third device may execute the computer program product provided in a pre-loaded state to perform the method according to the embodiments of the disclosure.

An embodiment of the disclosure may be implemented in the form of a computer-readable recording medium that includes computer-executable instructions such as program modules executed by the computer. The computer-readable recording medium may be an arbitrary available medium that may be accessed by the computer, including volatile, non-volatile, removable, and non-removable media. Furthermore, the computer-readable medium may include all of computer storage media and communication media. The volatile, non-volatile, removable, and non-removable media may be implemented by an arbitrary method or technology for storage of information, such as computer-readable instructions, data structures, program modules, or other data. The communication media may typically include computer-readable instructions, data structures, program modules, or other data in a modulated data signal such as a carrier wave, or other transport mechanism, and may include arbitrary information delivery media.

The aforementioned embodiments have been described for illustrative purposes, and a person of ordinary skill in the art will understand and appreciate that various modifications can be made without departing the scope of the disclosure. Thus, it will be apparent to those of ordinary skill in the art that the disclosure is not limited to the embodiments described, but can encompass not only the appended claims but the equivalents. For example, a component described in the singular form may be implemented as being distributed, and components described in a distributed form may be implemented as being combined.

The scope of the disclosure is defined by the appended claims, and it will be understood by those of ordinary skill in the art that various changes in form and details may be made without departing from the spirit and scope of the disclosure as defined by the appended claims and their equivalents.

The invention claimed is:

1. An operating method of an entrance management system, the operating method comprising:
   detecting an electronic device by using short-range wireless communication;
   measuring a distance between the electronic device and a sensor positioned inside an entrance including a first entrance and a second entrance;
   when the electronic device is determined to enter a first range based on the measured distance, opening the first entrance;
   when the measured distance between the electronic device and the sensor positioned inside the entrance is decreased to a preset value or less, closing the first entrances;
   when the electronic device enters a second range, obtaining at least one of a number of users positioned within the second range or a number of authenticated users; and
   when the number of users positioned within the second range or the number of authenticated users is not equal to the number of authenticated users allowed within the second range, not opening the second entrance.

2. The operating method of claim 1, further comprising, when the distance between the electronic device and the sensor positioned inside the entrance increases, immediately closing the first entrance.

3. The operating method of claim 2, further comprising, when a user is detected inside the first entrance after the first entrance is immediately closed, performing a procedure for dealing with the user.

4. The operating method of claim 1, further comprising performing an authentication procedure on the electronic device or a user of the electronic device.

5. The operating method of claim 1, further comprising:
   when the number of users positioned within the second range or the number of authenticated users is equal to a number of authenticated users allowed within the second range, opening the second entrance.

6. The operating method of claim 5,
   wherein the first entrance is an external entrance and the second entrance is an internal entrance, and
   wherein the second range is formed by physical barriers between the first entrance and the second entrance.

7. The operating method of claim 1, further comprising tracking the electronic device through trilateration using at least three fixed sensors,
   wherein the tracking of the electronic device comprises:
      obtaining first measurement information by measuring a position of the electronic device at a first time point, the first measurement information including time information about the first time point and first position information about the electronic device;
      obtaining second measurement information by measuring a position of the electronic device at a second time point, the second measurement information including time information about the second time point and second position information about the electronic device; and
      tracking the electronic device based on the first measurement information and the second measurement information.

8. The operating method of claim 1, further comprising tracking the electronic device through trilateration using at least one moving sensor,
   wherein the tracking of the electronic device comprises:
      obtaining first measurement information by measuring a relative position of the electronic device with respect to the at least one moving sensor at a first time point, the first measurement information including time information about the first time point and first relative position information about the electronic device;
      obtaining second measurement information by measuring a relative position of the electronic device with respect to the at least one moving sensor at a second time point, the second measurement information including time information about the second time point and second relative position information about the electronic device;
      obtaining third measurement information by measuring a relative position of the electronic device with respect to the at least one moving sensor at a third time point, the third measurement information including time information about the third time point and third relative position information about the electronic device; and
      tracking the electronic device based on the first measurement information, the second measurement information, and the third measurement information.

9. The operating method of claim 8, wherein the tracking of the electronic device based on the first measurement information, the second measurement information, and the third measurement information comprises:
   obtaining second sensor position information about the at least one moving sensor at the second time point based on first sensor position information about the at least one moving sensor at the first time point and movement information about the at least one moving sensor;
   obtaining third sensor position information about the at least one moving sensor at the third time point based on the first sensor position information, the second sensor position information, or the movement information about the at least one moving sensor; and
   tracking the electronic device based on the first sensor position information, the second sensor position information, and the third sensor position information.

10. The operating method of claim 8,
wherein the obtaining of the second measurement information further comprises estimating a positional movement of the electronic device or a movement speed of the electronic device and reflecting a compensation value according to the positional movement or the movement speed in the second relative position information, and wherein the obtaining of the third measurement information further comprises estimating a positional movement of the electronic device or a movement speed of the electronic device and reflecting a compensation value according to the positional movement or the movement speed in the third relative position information.

11. The operating method of claim 1, wherein the short-range wireless communication includes an ultra-wide band (UWB).

12. An entrance management system comprising:
an entrance including a first entrance and a second entrance;
a short-range wireless communicator;
at least one memory storing instructions for an operation of the entrance management system; and
at least one processor configured to execute the instructions to:
   detect an electronic device by using the short-range wireless communicator,
   measure a distance between the electronic device and a sensor positioned inside the entrance including the first entrance and the second entrance,
   open the first entrance when the electronic device is determined to enter a first range based on the measured distance,
   close the first entrance, when the distance between the electronic device and the sensor positioned inside the entrance is decreased to a preset value or less,
   when the electronic device enters a second range, obtain at least one of a number of users positioned within the second range or a number of authenticated users, and
   unopen the second entrance, when the number of users positioned within the second range or the number of authenticated users is not equal to the number of authenticated users allowed within the second range.

13. The entrance management system of claim 12, wherein the at least one processor is further configured to execute the instructions to:
when the distance between the electronic device and the sensor positioned inside the entrance increases, immediately close the first entrance.

14. The entrance management system of claim 13, wherein the at least one processor is further configured to execute the instructions to:
when a user is detected inside the first entrance by using the sensor after the first entrance is immediately closed, perform a procedure for dealing with the user.

* * * * *